US006925534B2

(12) United States Patent
David

(10) Patent No.: US 6,925,534 B2
(45) Date of Patent: Aug. 2, 2005

(54) DISTRIBUTED MEMORY MODULE CACHE PREFETCH

(75) Inventor: Howard S. David, Portland, OR (US)

(73) Assignee: Intel Corporation, Santa Clara, CA (US)

(*) Notice: Subject to any disclaimer, the term of this patent is extended or adjusted under 35 U.S.C. 154(b) by 117 days.

(21) Appl. No.: 10/039,580

(22) Filed: Dec. 31, 2001

(65) Prior Publication Data

US 2003/0126355 A1 Jul. 3, 2003

(51) Int. Cl.[7] .................... G06F 12/00

(52) U.S. Cl. .................... 711/137; 711/118; 711/128; 711/135; 711/136; 711/167; 711/168; 711/169

(58) Field of Search .................... 711/135–137, 118, 711/128, 167–169, 5, 104, 133, 204, 123; 710/6

(56) References Cited

U.S. PATENT DOCUMENTS 4,245,304 A * 1/1981 Porter et al. .......... 711/122
5,146,578 A * 9/1992 Zangenehpour .......... 711/137
5,353,424 A * 10/1994 Partovi et al. .......... 711/128
5,361,391 A * 11/1994 Westberg .......... 711/137
5,787,475 A * 7/1998 Pawlowski .......... 711/137
6,021,480 A * 2/2000 Pettey .......... 711/201
6,128,702 A * 10/2000 Saulsbury et al. .......... 711/133
6,216,178 B1 * 4/2001 Stracovsky et al. .......... 710/6
6,381,671 B1 * 4/2002 Ayukawa et al. .......... 711/104
6,728,840 B1 * 4/2004 Shatil et al. .......... 711/137
2002/0129215 A1 * 9/2002 Yoo et al. .......... 711/167

* cited by examiner

*Primary Examiner*—Matthew D. Anderson
*Assistant Examiner*—Zhuo H. Li
(74) *Attorney, Agent, or Firm*—Blakely, Sokoloff, Taylor & Zafman LLP

(57) ABSTRACT

One embodiment of a distributed memory module cache includes tag memory and associated logic implemented at the memory controller end of a memory channel. The memory controller is coupled to at least one memory module by way of a point-to-point interface. The data cache and associated logic are located in one or more buffer components on each of the memory modules. One intended advantage of this example embodiment is the ability to read a current line of data out of a memory module DRAM and to load the next cache line of data into the memory module data cache. This allows the utilization of excess DRAM interconnect bandwidth while preserving limited memory bus bandwidth.

21 Claims, 6 Drawing Sheets

DISTRIBUTED MEMORY MODULE CACHE PREFETCH

FIELD OF THE INVENTION

The present invention pertains to the field of computer systems. More particularly, this invention pertains to the field of memory system caches.

BACKGROUND OF THE INVENTION

For a number of years, computer system memory subsystems have relied on a "stub bus" topology where memory modules are plugged into connectors on a memory bus. Each memory module adds a short electrical stub to the memory bus. Each memory module may contain several dynamic random access memory (DRAM) components and one or more buffer components electrically situated between the DRAM and memory bus connections. The stub bus topology is limited by signal integrity issues as to how fast data can be transferred over the memory bus.

In order to improve data throughput from the memory modules to a memory controller, some prior computer systems have used memory data caches. One type of prior cache involves a cache that is closely associated with the memory controller. The cache logic and tag memory along with the data cache are implemented at the memory controller end of the memory bus. One disadvantage of this type of cache is that it is generally only beneficial if the cache is several times larger than the caches associated with the computer system processor or processors. Another disadvantage of this type of cache is that valuable memory bus bandwidth is used to load lines of data from the memory modules to the cache. Because much of the loaded data will ultimately not be used, valuable memory bus bandwidth is wasted transferring unnecessary data.

Another type of prior cache system includes a data cache located on the DRAM devices themselves. The logic and tag memory may be located at the memory controller end of the memory bus. These caches have the disadvantages of including a limited number of cache lines and also not storing the cached data any closer to the memory controller.

As more and more demands are placed on the memory subsystem, it will be desirable to implement a system memory cache that reduces read latencies and maximizes throughput while placing a minimum burden on memory bus bandwidth.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, one embodiment of a distributed memory module cache includes tag memory and associated logic implemented at the memory controller end of a memory channel. The memory controller is coupled to at least one memory module by way of a point-to-point interface. The data cache and associated logic are located in one or more buffer components on each of the memory modules. One intended advantage of this example embodiment is the ability to read a current line of data out of a memory module DRAM and to load the next cache line of data into the memory module data cache. This allows the utilization of excess DRAM interconnect bandwidth while preserving limited memory bus bandwidth.

Figure 1:
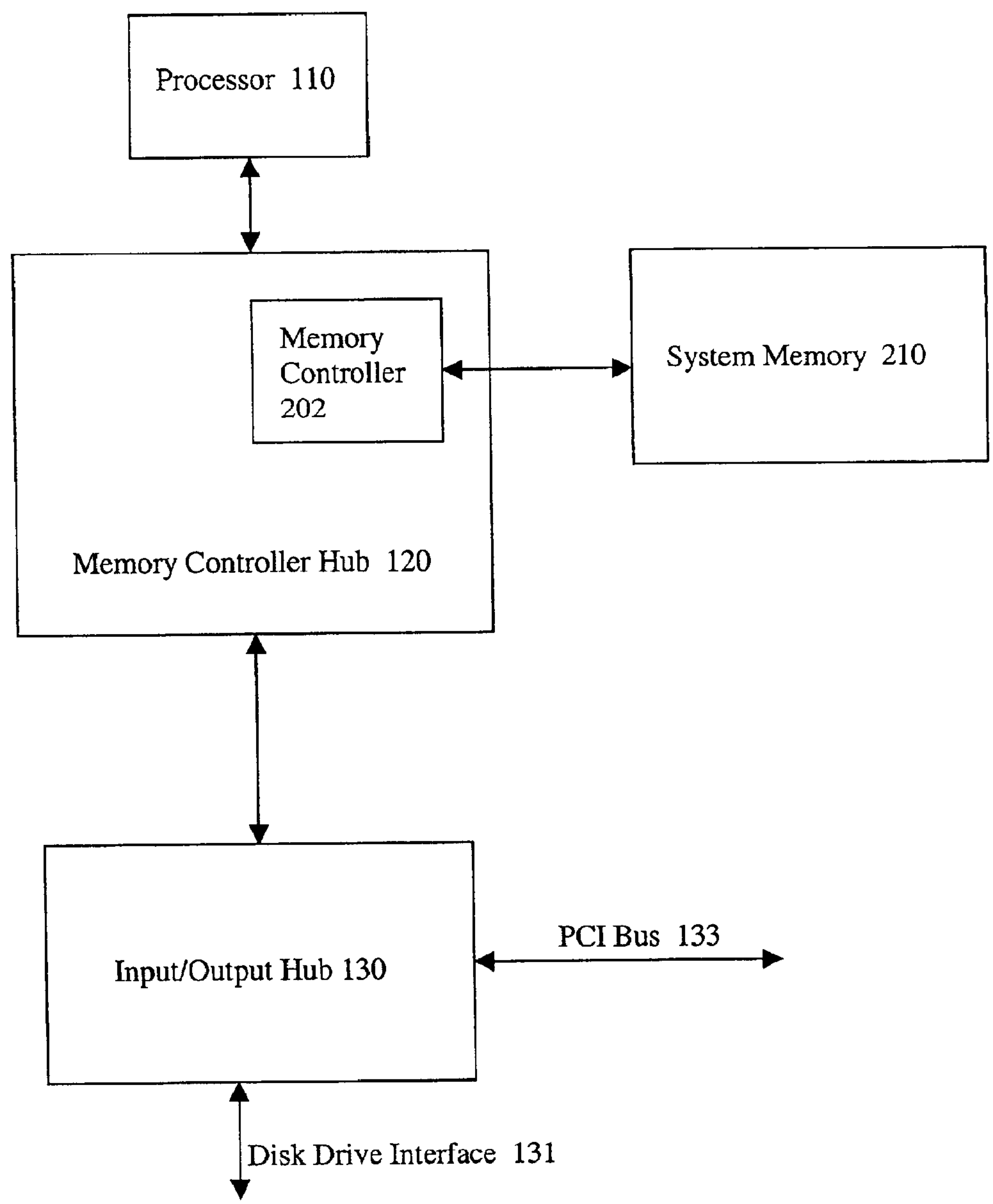
FIG. 1 is a block diagram of one embodiment of a computer system including a memory controller and a system memory.

FIG. 1 is a block diagram of one embodiment of a computer system. The computer system includes a processor 110 and a memory controller hub 120. The memory controller hub 120 includes a memory controller 202. The memory controller 202 is coupled to a system memory 210.

The memory controller hub 120 is also coupled to an input/output hub 130. The input/output hub 130 provides communication with a peripheral component interconnect (PCI) bus 133 and a disk drive interface 131.

Figure 2:
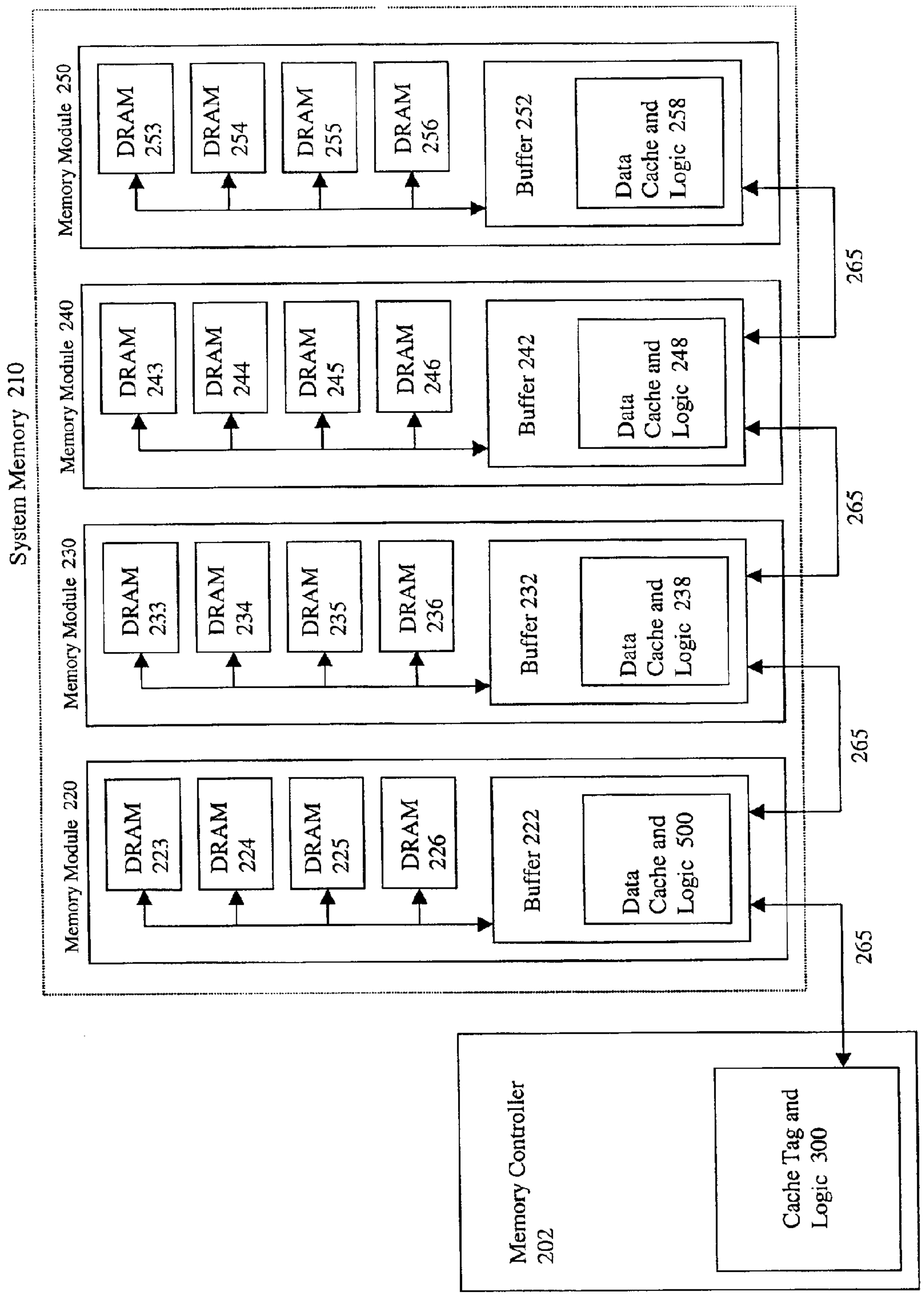
FIG. 2 is a block diagram of one embodiment of the memory controller including a cache tag and logic unit and the system memory including several memory modules.

FIG. 2 is a block diagram of one embodiment of the memory controller 202 including a cache tag and logic unit 300 and the system memory 210 including memory modules 220, 230, 240, and 250. The memory modules 220, 230, 240, and 250 include buffers 222, 232, 242, and 252, respectively. The buffers 222, 232, 242, and 252 include data cache and logic units 500, 238, 248, and 258, respectively. The memory module 220 includes DRAM components 223, 224, 225, and 226. The memory module 230 includes DRAM components 233, 234, 235, and 236. The memory module 240 includes DRAM components 243, 244, 245, and 246. The memory module 250 includes DRAM components 253, 254, 255, and 256.

In this example embodiment, the memory controller 202 is coupled to the memory modules 220, 230, 240, and 250 via a point-to-point interconnect 265. The interconnect 265 may include 18 differential pairs, 9 pairs for data, and 9 pairs for address and command. The interconnect may transfer data at a rate several times the rate of the buffer to DRAM interconnect. Another embodiment may use 27 differential pairs, 18 pairs for data, and 9 pairs for address and command. The interconnect 265 may also include 18 differential pairs, 9 pairs for read data, and 9 pairs for write data, address and command. Still other embodiments are possible using a wide range of interconnect techniques and numbers of signals.

The memory controller 202 uses the cache tag and logic unit 300 to deliver commands and addresses to the memory modules 220, 230, 240, and 250 over the interconnect 265. The memory controller 202 also delivers and receives data to and from the memory modules 220, 230, 240, and 250.

Although this example embodiment shows buffers 222, 232, 242, and 252 as being located on the memory modules 220, 230, 240, and 250, respectively, other embodiments may implement these buffers on a motherboard instead of on the memory modules.

Whether on the motherboard or on the memory modules, the buffers may be implemented using more than one buffer component per memory module. Also, although this example embodiment shows four memory modules, other embodiments may include other numbers of memory modules. Further, other DRAM device configurations and numbers of DRAM components may be supported in other embodiments. Other embodiments are possible where the DRAM is placed on a motherboard rather that on a memory module. Still other embodiments are possible using types of memory devices other than DRAM.

The data cache and logic 500, 238, 248, and 258, along with the cache tag and logic 300, may comprise a 4 way set-associative cache. Other embodiments are possible using other numbers of ways. Some possible cache sizes include 288 kB, 576 kB, and 1152 kB. Other embodiments are possible using different cache sizes. The data cache and logic units 500, 238, 248, and 258 may include either embedded DRAM or static random access memory (SRAM).

The cache line size for these example embodiments may be 72 bytes. The 72 bytes are transferred from the memory controller 202 to the memory modules 220, 230, 240, and 250 in bursts of eight transactions with 9 bytes being transferred per transaction. These example embodiments may also include an optional segmented cache. For a segmented cache, the cache line size is reduced to 36 bytes. The 36 bytes are transferred in bursts of four transactions with 9 bytes per transaction. The optionally segmented cache allows these example embodiments to support both memory devices that are optimized for bursts of eight and also memory devices that are optimized for bursts of four. By segmenting the cache when the cache line size is reduced to 36 bytes, the entire cache can be accessed without doubling the number of tags in the memory controller 202.

Figure 3:
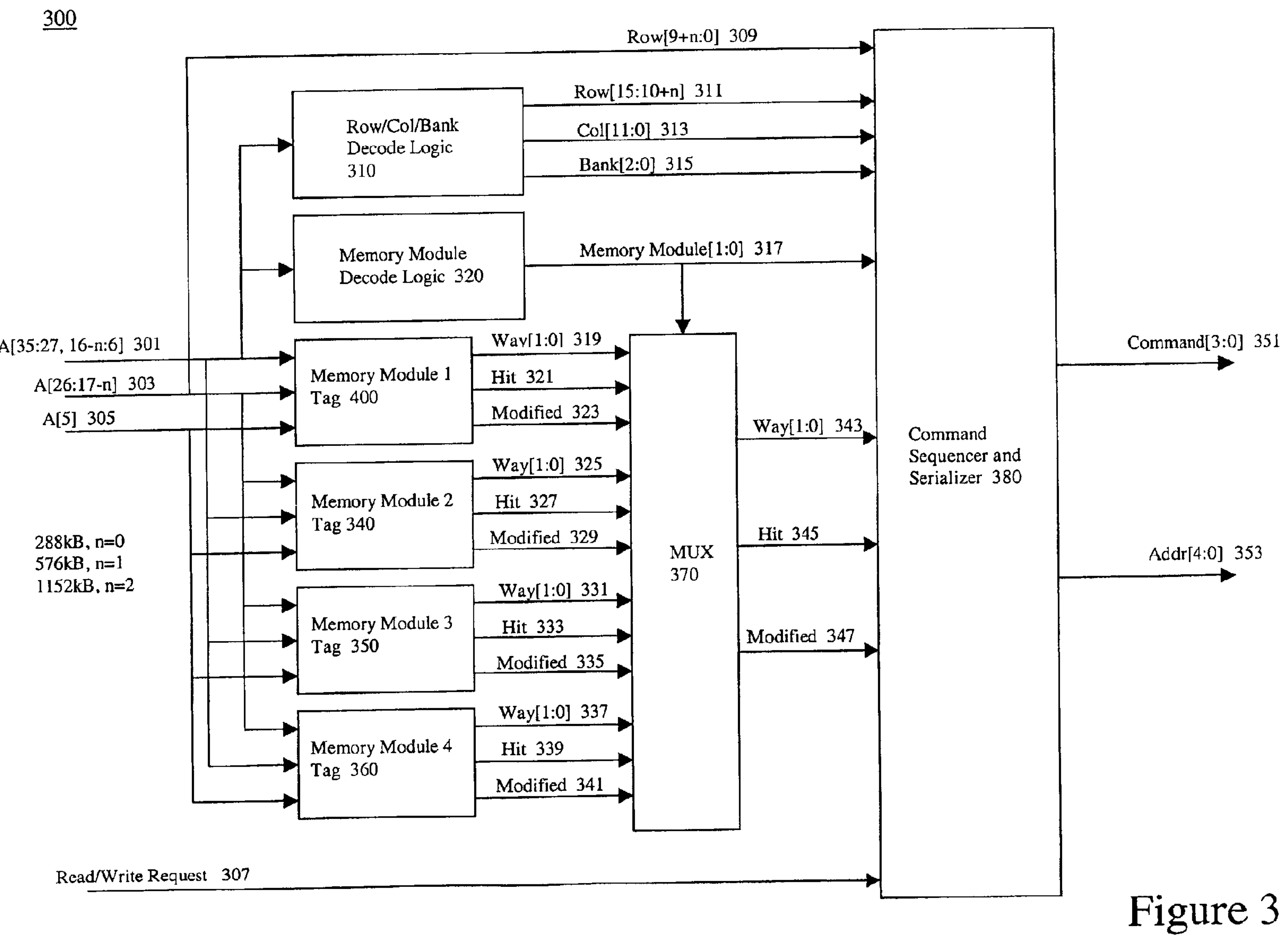
FIG. 3 is a block diagram of an example embodiment of the cache tag and logic unit.

FIG. 3 is a block diagram of an example embodiment of the cache tag and logic unit 300. The cache tag and logic unit 300 receives several groups of address information from the memory controller 202 which may receive this address information from a system agent such as the processor 110. One group of address lines includes A[35:27, 16−n:6] 301. The variable "n" may be "0" for a 288 kB cache, or "1" for a 576 kB cache, or "2" for a 1152 kB cache. Another address group includes A[26:17−n] 303 and another address group includes the single line A[5] 305.

The address lines A[35:27, 16−n:6] 301 are delivered to a row/column/bank decode logic unit 310. From the address lines A[35:27, 16−n:6] 301, the row/column/bank decode logic unit 310 derives row addresses row[15:10+n] 311, column addresses col[11:0] 313, and DRAM bank information bank[1:0] 315.

The address lines A[35:27, 16−n:6] 301 are also delivered to a memory module decode logic unit 320. From the address line A[35:27, 16−n:6] 301, the memory module decode logic unit 320 decodes which memory module is being addressed and communicates this information via memory module[1:0] signals 317. The address lines A[35:27, 16−n:6] 301 are further coupled to a memory module 1 tag unit 400, a memory module 2 tag unit 340, a memory module 3 tag unit 350, and a memory module 4 tag unit 360.

The address lines A[26:17−n] 303 are used to create row addresses row[9+n:0] 309. The address lines A[26:17−n] 303 are also coupled to the memory module 1 tag unit 400, the memory module 2 tag unit 340, the memory module 3 tag unit 350, and the memory module 4 tag unit 360. The address line A[5] is also coupled to the memory module 1 tag unit 400, the memory module 2 tag unit 340, the memory module 3 tag unit 350, and the memory module 4 tag unit 360.

The memory module 1 tag unit 400, the memory module 2 tag unit 340, the memory module 3 tag unit 350, and the memory module 4 tag unit 360 each perform look-ups into their respective tag arrays to determine whether there is a cache hit and to determine whether data has been modified. The memory module tag units 400, 340, 350, and 360 also determine which cache way is currently implicated. The memory module 1 tag unit 400, and by extension the other tag units, will be discussed in more detail below.

The memory module 1 tag unit 400 communicates cache way information to a multiplexer (MUX) 370 via signals way[1:0] 319. Cache hit information is delivered to the MUX 370 over a hit 321 signal. Cache line modification information is communicated over a modified 323 signal. The memory module 2 tag unit 340 communicates cache way information to the MUX 370 via signals way[1:0] 325. Cache hit information is delivered to the MUX 370 over a hit 327 signal. Cache line modification information is communicated over a modified 329 signal. The memory module 3 tag unit 350 communicates cache way information to the MUX 370 via signals way[1:0] 331. Cache hit information is delivered to the MUX 370 over a hit 333 signal. Cache line modification information is communicated over a modified 335 signal. The memory module 4 tag unit 360 communicates cache way information to the MUX 370 via signals way[1:0] 337. Cache hit information is delivered to the MUX 370 over a hit 339 signal. Cache line modification information is communicated over a modified 341 signal.

The MUX 370 receives the memory module[1:0] 317 signals and uses these signals to determine which of the way[1:0] signals 319, 325, 331, and 337 to pass on to a command sequencer and serializer unit 380 via way[1:0] 343 signals. Similarly, the state of the memory module[1:0] 317 signals determines which of the hit 321, 327, 333, and 339 signals are delivered to the command sequencer and serializer unit 380 over the hit 345 signal. The memory module[1:0] 317 signals also determine which of the modified signals 323, 329, 335, and 341 are communicated to the command sequencer and serializer unit 380 via the modified 347 signal.

The command sequencer and serializer unit 380 also receives the row[9+n:0] 309, row[15:10+n] 311, col[11:0] 313, bank[2:0] 315, and memory module[1:0] 317 signals. The command sequencer and serializer unit 380 uses the inputs described above in addition to other communications from the memory controller 202 to generate a series of command signals command[3:0] 351 and address signals addr[4:0] 353. The command[3:0] 351 and addr[4:0] 353 signals are delivered to the memory modules 220, 230, 240, and 250 over the interconnect 265. A discussion of some of the possible commands for these example embodiments appears below.

In the cache tag and logic unit 300, the actions of the tag look-up and memory module decode occur in parallel. That is, while the memory module decode logic 320 is determining the proper memory module for the current transaction, the memory module tag units 400, 340, 350, and 360 are performing their look-ups. Different sub-sets of the address information are used to perform the tag look-ups and the memory module decode. For this example embodiment, the address lines A[26:17−n] are used as an index into the tag arrays (see FIG. 4, below). The address lines A[35:27, 16−n:6] are used to perform the memory module decode.

Figure 4:
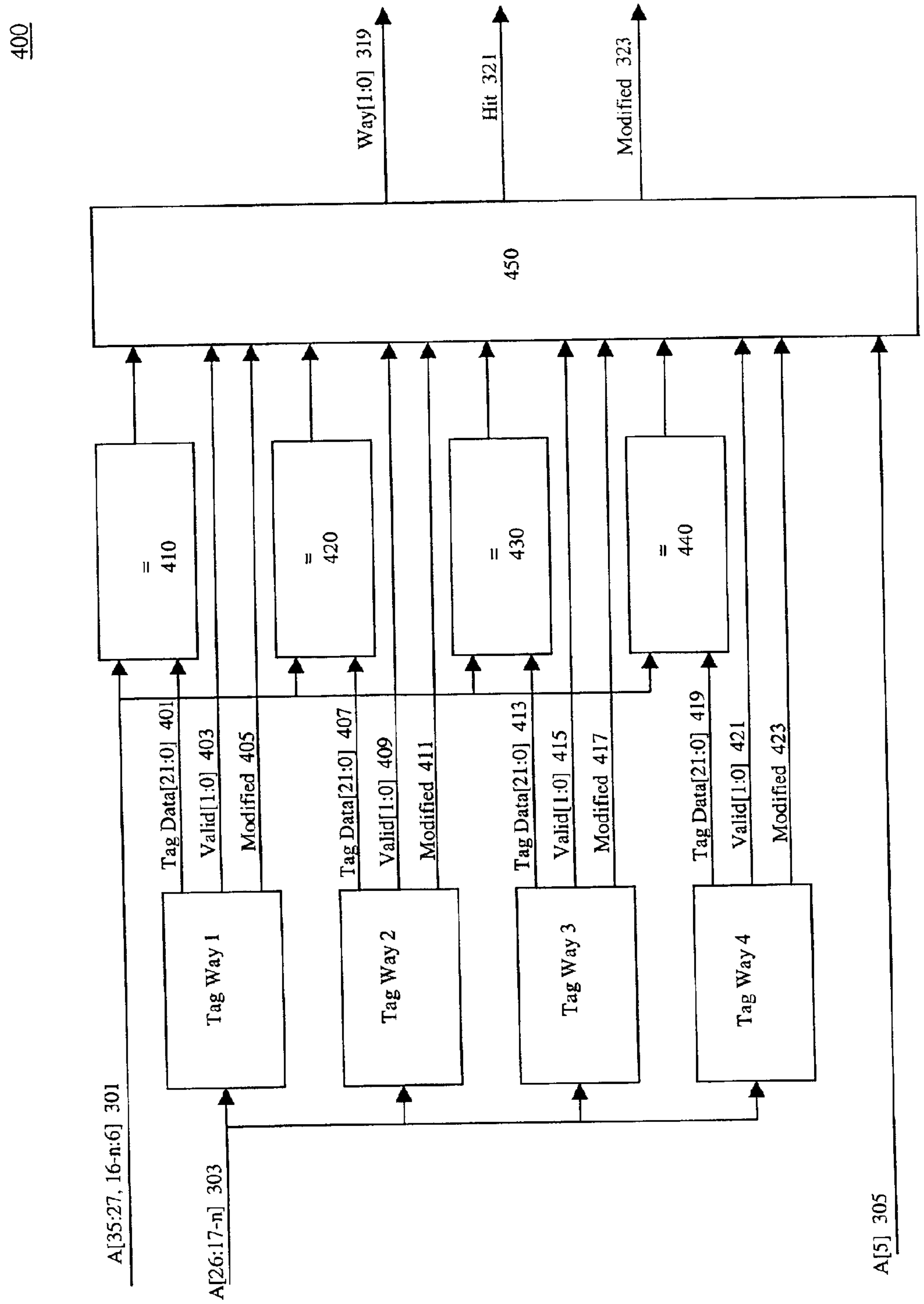
FIG. 4 is a block diagram of a tag unit included in the cache tag and logic unit.

FIG. 4 is a block diagram of the memory module 1 tag unit 400. The address lines A[26:17−n] 303 are received at a tag way 1, tag way 2, tag way 3, and tag way 4 units. These tag way units contain arrays of tag addresses. Because the cache for this example embodiment is a 4-way set associative cache, there are tag arrays for each of the 4 ways. The address lines A[26:17−n] 303 provide an index into the tag way units 1, 2, 3, and 4. The cache lines associated with the index for the tag way units 1, 2, 3, and 4 are placed on tag data[21:0] lines 401, 407, 413, and 419 respectively. The tag data[21:0] 401, 407, 413, and 419 are delivered to comparators 410, 420, 430, and 440, respectively.

The comparators 410, 420, 430, and 440 compare the received tag data with the address lines A[35:27, 16−n:6] 301 to determine whether there is a tag match and therefore a cache hit. The tag match information is communicated with a logic unit 450. The logic unit 450 also receives valid[1:0] signals 403, 409, 415, and 421 from the tag way units 1, 2, 3, and 4 respectively. When the cache is set up as a segmented cache, the valid[1:0] signals 403, 409, 415, and 421 indicate which cache lines associated with a tag address are valid. The state of the address line A[5] 305 indicates to the logic unit 450 which of the two valid bits are appropriate. The logic unit 450 further receives modified signals 405, 411, 417, and 423 from the tag way units 1, 2, 3, and 4, respectively. With this information, the logic unit 450 is able to generate the way[1:0] signals 319 which indicate which way is implicated by the current transaction. The logic unit 450 also generates the hit signal 321 which indicates if there has been a tag match. The logic unit 450 further generates the modified signal 323.

Figure 5:
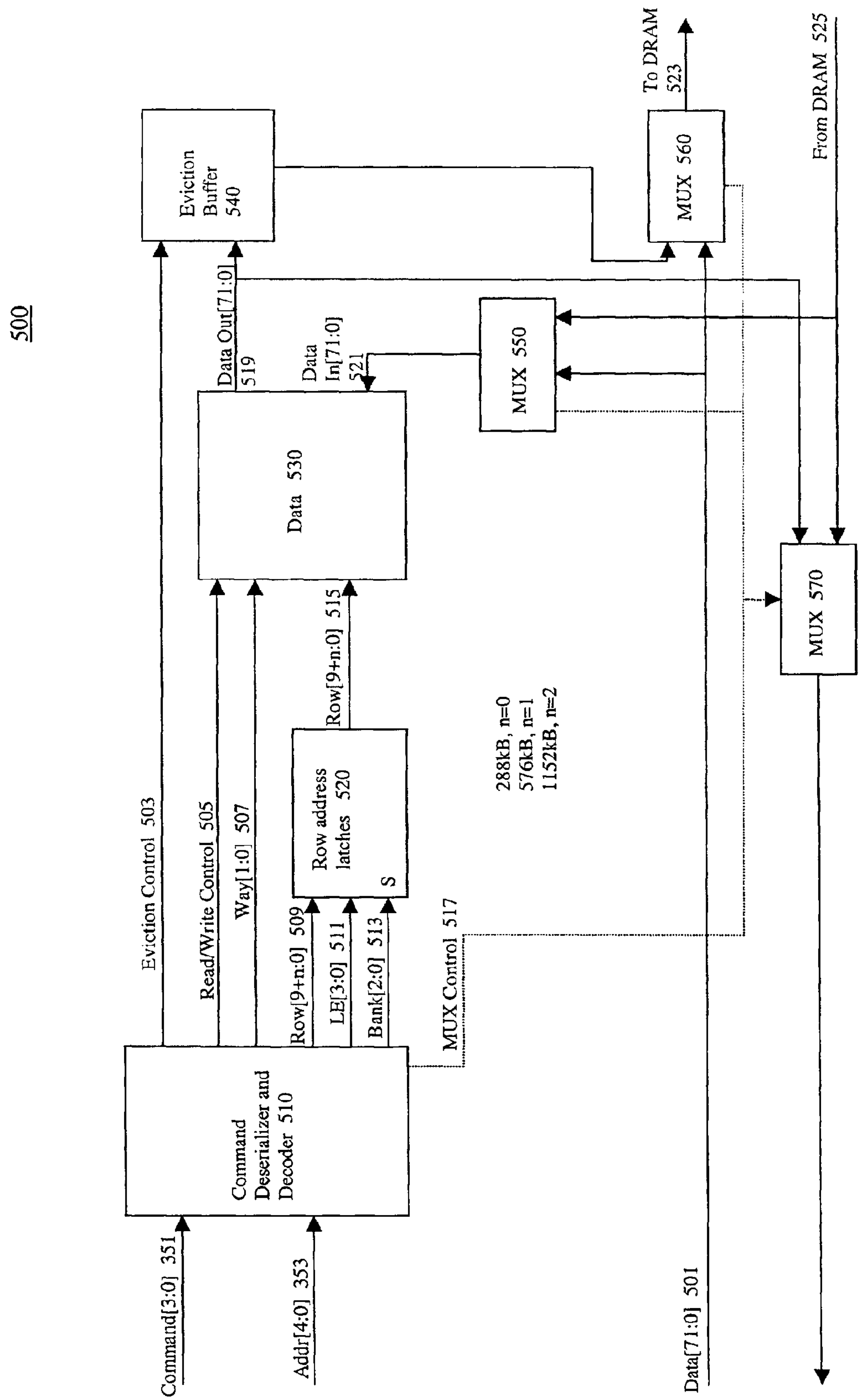
FIG. 5 is a block diagram of one embodiment of a data cache and logic unit located on a memory module.

FIG. 5 is a block diagram of one embodiment of the data cache and logic unit 500. The data cache and logic unit 500 receives the command[3:0] signals 351 and the addr[4:0] lines 353 at a command deserializer and decoder unit 510. The command deserializer and decoder unit 510 processes the received command and address information and provides control for an eviction buffer 540, a cache data unit 530, row address latches 520, and MUXs 550, 560, and 570. The MUXs 550, 560, and 570 are controlled via MUX control signals 517. The row address latches 520 receive row addresses row[9+n:0] 509 from the command deserializer and decoder unit 510. The command deserializer and decoder unit 510 also delivers latch enable signals LE[3:0] 511 and bank address lines bank[2:0] 513 to the row address latches 520. The row address latches 520 in turn deliver a selected row address to the cache data unit 530. The eviction buffer 540 receives output data 519 from the cache data 530. When cache lines are evicted out of the cache data 530, the lines are stored temporarily in the eviction buffer 540. The eviction buffer 540 is controlled via eviction control signals 503 from the command deserializer and decoder unit 510.

The example embodiments described herein implement a write-back policy. That is, write transactions from the memory controller 202 to the system memory 210 may be stored in the memory module data caches until evicted from the cache. The evicted cache lines are stored in an eviction buffer until the memory controller 202 determines that the DRAM for that memory module is not busy and signals a writeback command. The cache line is then delivered from the eviction buffer to the DRAM.

The write-back cache allows write data to be held until a time that the DRAM interconnect is not busy. The data stays in the cache until the memory controller signals an eviction, which moves that cache line to the eviction buffer. If the row for that cache line is not open, an activate command is issued (the activate command is discussed below). Lastly, the writeback command supplies way and bank information in order to write the data in to the DRAM. In two and four processor systems, it is common for some cache lines to move back and forth between processors, with a write to memory for each transfer. If a line is being moved back and forth frequently, the write-back cache will reduce the amount of writes to the DRAM.

Data that is transferred over the interconnect 265 is assembled or disassembled by the buffer 222. The buffer 222 delivers data[71:0] 501 to the MUX 560 and to the MUX 550. The MUX 560 also receives the output from the eviction buffer 540. The MUX 560 passes either the data [71:0] signals 501 or the output of the eviction buffer 540 to the DRAM devices depending on the state of the MUX control signals 517.

The MUX 570 receives data from the DRAM devices and also receives data out[71:0] signals 519 from the cache data 530. The MUX 570 passes either the data from the DRAM devices or the data out[71:0] 519 to the buffer 222 depending on the state of the MUX control signals 517.

As previously mentioned, the buffer 222 delivers data [71:0] 501 to the MUX 560 and to the MUX 550. The MUX 550 also receives data from the DRAM devices. The MUX 550 passes either the data[71:0] signals 501 or the data from the DRAM devices to the cache data 530 via the data in[71:0] signals 521.

The memory controller 202 may cause a number of commands to be executed by the data cache and logic unit 500. These commands are communicated by the command sequencer and serializer unit 380 to the data cache and logic unit 500 using the command[3:0] signals 351 and the addr[4:0] signals 353. Some of the possible commands include activate, read, write, cache fetch, cache load, read and load, write and load, read and preload, read and load double, writeback, and refresh. Using the read command, data is retrieved from DRAM and returned to the requesting device without storing the data in the cache. The read and load command retrieves data from DRAM and loads the data into the cache while delivering the data to the requesting device. The read and preload command retrieves a line of data from DRAM and delivers the data to the requesting device and also loads an additional line of data into the cache. The read and load double command retrieves a line of data from DRAM and delivers the data to the requesting device and also loads two additional line of data into the cache.

The activate command involves storing a row address in one of the banks of the DRAM devices on a memory module and activating the sense amplifiers for that row of that bank in those DRAM, so that the data in that row may be accessed. A new row address is also loaded into the row address latches 520. Table 1 describes how the command sequencer and serializer unit 380 transfers the activate command to the memory modules.

TABLE 1

Activate Command

| Signal | Activate Command Transfer 1 | 2 | 3 | 4 |
|---|---|---|---|---|
| Command 0 | Dest 0 | RAS = 1 | | Hit = 0 |
| Command 1 | Dest 1 | CAS = 0 | | |
| Command 2 | | WE = 0 | | |
| Command 3 | | | | |
| Addr 0 | RA0 | RA4 | RA8 | RA12 |
| Addr 1 | RA1 | RA5 | RA9 | RA13 |
| Addr 2 | RA2 | RA6 | RA10 | RA14 |

TABLE 1-continued

Activate Command

| Signal | Activate Command Transfer 1 | 2 | 3 | 4 |
|---|---|---|---|---|
| Addr 3 | RA3 | RA7 | RA11 | RA15 |
| Addr 4 | BA0 | BA1 | BA2 | |

During the first transfer period, the command[1:0] lines carry a destination designation (Dest) that identifies to which memory module the command is intended. During the second transfer period the command[2:0] lines carry state information for a row address strobe (RAS), a column address strobe (CAS), and a write enable signal (WE). During the fourth transfer period, the command 0 line gives an indication that there is no cache hit.

The addr[3:0] lines provide row address (RA) information during the four transfer periods. The addr 4 line provides bank address information (identifying a DRAM bank) during the first three transfer periods. The bank address information is used to store a new row address into the row address latches 520.

The cache fetch command involves reading a line of data out of the cache of the identified memory module. Table 2 describes how the command sequencer and serializer unit 380 transfers the cache fetch command to the memory modules.

TABLE 2

Cache Fetch Command

| Signal | Cache Fetch Command Transfer 1 | 2 | 3 | 4 |
|---|---|---|---|---|
| Command 0 | Dest 0 | RAS = 1 | | Hit = 1 |
| Command 1 | Dest 1 | CAS = 0 | | Way 0 |
| Command 2 | | WE = 0 | | Way 1 |
| Command 3 | | | | |
| Addr 0 | RA0 | RA4 | RA8 | RA12 |
| Addr 1 | RA1 | RA5 | RA9 | RA13 |
| Addr 2 | RA2 | RA6 | RA10 | RA14 |
| Addr 3 | RA3 | RA7 | RA11 | RA15 |
| Addr 4 | BA0 | BA1 | BA2 | |

The cache fetch command information is much the same as that for the activate command. However, in the fourth transfer period, the command 0 line carries an indication of a cache hit. The command[2:1] lines carry information indicating which cache way is implicated by the cache hit during the fourth transfer period. By providing the cache hit and way information in the last transfer period, the cache tag and logic unit 300 has the maximum amount of time to perform a tag look-up and to determine which command to transfer. Notice that the only differences between the activate command and the cache fetch command are the hit and way information in the last transfer period.

The read command causes data to be read out of DRAM without being loaded into the cache. Table 3 describes how the command sequencer and serializer unit 380 transfers the read command to the memory modules.

TABLE 3

Read Command

| Signal | Read Command Transfer 1 | 2 | 3 | 4 |
|---|---|---|---|---|
| Command 0 | Dest 0 | RAS = 0 | | Hit = 0 |
| Command 1 | Dest 1 | CAS = 1 | | |
| Command 2 | | WE = 0 | | |
| Command 3 | | | | |
| Addr 0 | CA0 | CA4 | CA8 | CA12 |
| Addr 1 | CA1 | CA5 | CA9 | CA13 |
| Addr 2 | CA2 | CA6 | CA10 | |
| Addr 3 | CA3 | CA7 | CA11 | |
| Addr 4 | BA0 | BA1 | BA2 | |

During the first transfer period, the command[1:0] lines carry a destination designation (Dest) that identifies to which memory module the command is intended. During the second transfer period the command[2:0] lines carry state information for a row address strobe (RAS), a column address strobe (CAS), and a write enable signal (WE). During the fourth transfer period, the command 0 line gives an indication that there is no cache hit.

The addr[3:2] lines provide column address (CA) information during the first three transfer periods. The addr[1:0] lines provide column address information during each of the four transfer periods. The addr 4 line provides bank address information during the first three transfer periods. The bank address information is used to select a previously stored row address from the row address latches 520.

The read and preload command involves reading a line of data out of the DRAM devices of the identified memory module and then preloading an additional line of data into the data cache. Table 4 describes how the command sequencer and serializer unit 380 transfers the read and preload command to the memory modules.

TABLE 4

Read and Preload Command

| Signal | Read and Preload Command Transfer 1 | 2 | 3 | 4 |
|---|---|---|---|---|
| Command 0 | Dest 0 | RAS = 0 | | Hit = 1 |
| Command 1 | Dest 1 | CAS = 1 | | Way 0 |
| Command 2 | | WE = 0 | | Way 1 |
| Command 3 | | | | Evict |
| Addr 0 | CA0 | CA4 | CA8 | CA12 |
| Addr 1 | CA1 | CA5 | CA9 | CA13 |
| Addr 2 | CA2 | CA6 | CA10 | |
| Addr 3 | CA3 | CA7 | CA11 | |
| Addr 4 | BA0 | BA1 | BA2 | |

The read and preload command information is much the same as that for the read command. However, in the fourth transfer period, the command 0 line carries an indication of a cache hit. The command[2:1] lines carry information indicating which cache way is implicated by the cache hit during the fourth transfer period. By providing the cache hit and way information in the last transfer period, the cache tag and logic unit 300 has the maximum amount of time to perform a tag look-up and to determine which command to transfer. The command 3 line includes control information for the eviction buffer 540. Notice that the only differences between the read command and the read and preload command are the hit, way, and eviction information in the last transfer period.

Figure 6:
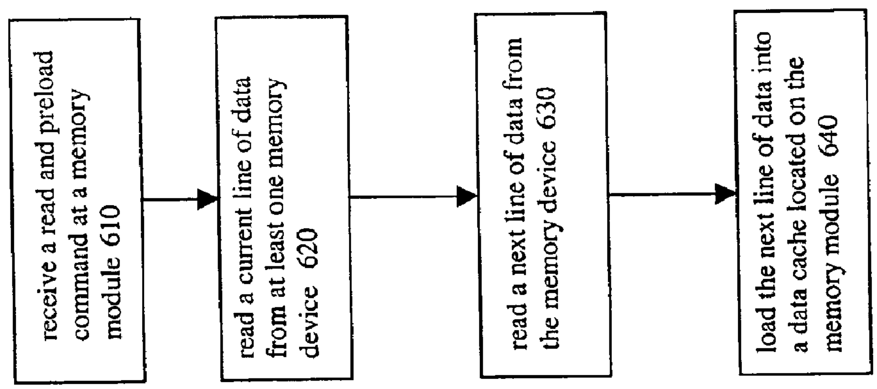
FIG. 6 is a flow diagram of one embodiment of a method for performing a read and preload command.

FIG. 6 is a flow diagram of one embodiment of a method for performing a read and preload command. At block 610, a read and preload command is received at a memory module. At block 620, a current line of data is read from at least one memory device. This line of data is returned to a requesting device. At block 630, a next line of data is read from the memory device. This operation may occur in parallel with returning the current line of data to the requesting device. At block 640, the next line of data is loaded into a data cache located on the memory module.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:

an array of tag address storage locations; and a command sequencer and serializer unit coupled to the array of tag address storage locations, the command sequencer and serializer unit to control a data cache located on a memory module via a plurality of command lines and address lines over an interconnect, the command sequencer and serializer unit to cause a current line of data to be read out from a first location of a memory module memory device and to load a next line of data from a second location of the memory module memory device to the data cache, in response to a single command having a plurality of segments serialized and sequentially transmitted via the plurality of address lines and command lines over the interconnect within a single memory access transaction, wherein the single command includes at least one of memory module destination information, cache way information, address strobe state information, cache hit information, column address information, and memory device bank information, wherein the single command is delivered over a plurality of transfer periods within a single memory access transaction, and wherein the cache hit information and cache way information is transferred during a last transfer period of the transfer periods.

2. The apparatus of claim 1, wherein the single command comprises a read and preload command delivered to the data cache located on the memory module, the read and preload command to cause the current line of data to be read out from the first location of the memory module memory device and to load the next line of data from the second location of the memory module memory device to the data cache.

3. The apparatus of claim 2, wherein the read and preload command information is delivered over four transfer periods within a single memory access transaction.

4. The apparatus of claim 1, wherein each of the segments is transmitted within one of the transfer periods over one of the command and address lines.

5. The apparatus of claim 4, wherein a segment of the command transmitted in the last transfer period of a command line includes information indicating a cache hit.

6. The apparatus of claim 4, wherein a segment of the command transmitted in the last transfer period of a command line includes information implicating a cache way of the data cache on a memory module.

7. The apparatus of claim 4, wherein a segment of the command transmitted in the last transfer period of a command line includes eviction information of an eviction buffer of the data cache.

8. An apparatus, comprising:

an array of tag address storage locations; and a command sequencer and serializer unit coupled to the array of tag address storage locations, the command sequencer and serializer unit to control a data cache located on a memory module via a plurality of command lines and address lines over an interconnect, the command sequencer and serializer unit to cause a current line of data to be read out from a first location of a memory module memory device and to load a next line of data from a second location of the memory module memory device to the data cache, in response to a single command having a plurality of segments serialized and sequentially transmitted via the plurality of address lines and command lines over the interconnect within a single memory access transaction, wherein the single command comprises a read and preload command delivered to the data cache located on the memory module, the read and preload command to cause the current line of data to be read out from the first location of the memory module memory device and to load the next line of data from the second location of the memory module memory device to the data cache, wherein the read and preload command includes memory module destination information, cache way information, address strobe state information, cache hit information, column address information, and memory device bank information, wherein the read and preload command information is delivered over four transfer periods within a single memory access transaction, and wherein the cache hit information and cache way information is transferred during the fourth transfer period of the four transfer periods.

9. A memory module, comprising:

at least one memory device; and a data cache coupled to the memory device, the data cache controlled,by a plurality of commands delivered by a memory controller over a plurality of command lines and address lines of an interconnect, the memory controller component including an array of tag address storage locations, the plurality of commands including a read and preload command, as a single command having a plurality of segments, when serialized and sequentially received from the memory controller over the plurality of command and address lines within a single memory access transaction, to cause a current line of data to be read out from a first location of the memory device and to load a next line of data from a second location of the memory device to the data caches, wherein the read and preload command includes at least one of memory module destination information, cache way information, address strobe state information, cache hit information, column address information, and memory device bank information, wherein the read and preload command is delivered over a plurality of transfer periods within a single memory access transaction, and wherein the cache hit information and cache way information is transferred during a last transfer period of the transfer periods.

10. The memory module of claim 9, wherein the read and preload command information is received over four transfer periods.

11. A memory module, comprising:

at least one memory device; and a data cache coupled to the memory device, the data cache controlled by a plurality of commands delivered by a memory controller over a plurality of command lines and address lines of an interconnect, the memory controller component including an array of tag address storage locations, the plurality of commands including a read and preload command, as a single command having a plurality of segments, when serialized and sequentially received from the memory controller over the plurality of command and address lines within a single memory access transaction, to cause a current line of data to be read out from a first location of the memory device and to load a next line of data from a second location of the memory device to the data cache, wherein the read and preload command includes memory module destination information, cache way information, address strobe state information, cache hit information, column address information, and memory device bank information, wherein the read and preload command information is received over four transfer periods, and wherein the cache hit information and cache way information is transferred during the fourth transfer period of the four transfer periods.

12. A system, comprising:

a processor;

a memory controller coupled to the processor, the memory controller including an array of tag address storage locations, and a command sequencer and serializer unit coupled to the array of tag address storage locations; and a memory module coupled to the memory controller via a plurality of command lines and address lines over an interconnect, the memory module including at least one memory device, and a data cache coupled to the memory device, the data cache controlled by a plurality of commands delivered by the memory controller, one of the plurality of commands including a read and preload command, as a single command having a plurality of segments, when serialized and sequentially received from the memory controller over the plurality of command and address lines within a single memory access transaction, to cause a current line of data to be read out from a first location of the memory device and to load a next line of data from a second location of the memory device to the data cache, wherein the read and preload command includes at least one of memory module destination information, cache way information, address strobe state information, cache hit information, column address information, and memory device bank information, wherein the read and preload command is delivered over a plurality of transfer periods within a single memory access transaction, and wherein the cache hit information and cache way information is transferred during a last transfer period of the transfer periods.

13. The system of claim 12, wherein the memory module further includes a command decoder and deserializer unit to receive command and address information from the memory controller, the command decoder and deserializer unit providing control for the data cache.

14. The system of claim 12, wherein the read and preload command information is delivered over four transfer periods.

15. The system of claim 12, further comprising a point-to-point interconnect to couple the memory controller to the memory module.

16. A system, comprising:

a processor;

a memory controller coupled to the processor, the memory controller including an array of tag address storage locations, and a command sequencer and serializer unit coupled to the array of tag address storage locations; and a memory module coupled to the memory controller via a plurality of command lines and address lines over an interconnect, the memory module including at least one memory device, and a data cache coupled to the memory device, the data cache controlled by a plurality of commands delivered by the memory controller, one of the plurality of commands including a read and preload command, as a single command having a plurality of segments, when serialized and sequentially received from the memory controller over the plurality of command and address lines within a single memory access transaction, to cause a current line of data to be read out from a first location of the memory device and to load a next line of data from a second location of the memory device to the data cache, wherein the memory module further includes a command decoder and deserializer unit to receive command and address information from the memory controller, the command decoder and deserializer unit providing control for the data cache, wherein the read and preload command includes memory module destination information, cache way information, address strobe state information, cache hit information, column address information, and memory device bank information, wherein the read and preload command information is delivered over four transfer periods, and wherein the cache hit information and cache way information is delivered during the fourth transfer period.

17. An apparatus, comprising:

an array of tag address storage locations; and a command sequencer and serializer unit coupled to the array of tag address storage locations, the command sequencer and serializer unit to control a data cache located on a memory module via a plurality of command lines and address lines over an interconnect, the command sequencer and serializer unit to cause a current line of data to be read out from a first location of a memory module memory device and to load a next line of data from a second location of the memory module memory device to the data cache, in response to a single command having a plurality of segments serialized and sequentially transmitted via the plurality of address lines and command lines over the interconnect within a single memory access transaction, wherein each of the segments is transmitted within one of the transfer periods over one of the command and address lines, and wherein the plurality of transfer periods includes at least four transfer periods and wherein the plurality of command and address lines includes at least four command lines and five address lines.

18. The apparatus of claim 17, wherein a segment of the command transmitted over the first and second command lines of the four command lines during the first transfer period of the four transfer periods includes destination information indicating which memory module is being addressed.

19. The apparatus of claim 17, wherein a segment of the command transmitted over the first command line of the four command lines during the second transfer period of the four transfer periods includes state information of a row address strobe (RAS).

20. The apparatus of claim 17, wherein a segment of the command transmitted over the second command line of the four command lines during the second transfer period of the four transfer periods includes state information of a column address strobe (CAS).

21. The apparatus of claim 17, wherein a segment of the command transmitted over the third command line of the four command lines during the second transfer period of the four transfer periods includes state information of a write enable (WE) signal.

* * * * *